(12) United States Patent  (10) Patent No.: US 8,402,260 B2
Mizumoto  (45) Date of Patent: Mar. 19, 2013

(54) DATA PROCESSING APPARATUS HAVING ADDRESS CONVERSION CIRCUIT

(75) Inventor: Katsuya Mizumoto, Tokyo (JP)

(73) Assignee: Renesas Electronics Corporation, Kanagawa (JP)

( * ) Notice: Subject to any disclaimer, the term of this patent is extended or adjusted under 35 U.S.C. 154(b) by 959 days.

(21) Appl. No.: 12/465,285

(22) Filed: May 13, 2009

(65) Prior Publication Data

US 2009/0319767 A1 Dec. 24, 2009

(30) Foreign Application Priority Data

Jun. 20, 2008 (JP) ................................. 2008-162037

(51) Int. Cl.
*G06F 15/177* (2006.01)
(52) U.S. Cl. .............................. 713/2; 713/1
(58) Field of Classification Search .................... 713/1, 2
See application file for complete search history.

(56) References Cited

U.S. PATENT DOCUMENTS

| | | | | |
|---|---|---|---|---|
| 5,418,915 | A * | 5/1995 | Matuda et al. .................. | 712/22 |
| 5,903,771 | A * | 5/1999 | Sgro et al. ........................ | 712/20 |
| 6,405,302 | B1 | 6/2002 | Ohsuga et al. | |
| 7,774,617 | B2 * | 8/2010 | Dale et al. ....................... | 713/189 |
| 2004/0064746 | A1 * | 4/2004 | Nishimoto et al. ............. | 713/323 |
| 2005/0285862 | A1 | 12/2005 | Noda et al. | |
| 2006/0101231 | A1 | 5/2006 | Higashida | |
| 2006/0143428 | A1 | 6/2006 | Noda et al. | |
| 2008/0052497 | A1 | 2/2008 | Sueyoshi et al. | |

FOREIGN PATENT DOCUMENTS

| | | |
|---|---|---|
| JP | 62-117056 U | 7/1987 |
| JP | 09-022379 | 1/1997 |
| JP | 2006-099232 | 4/2006 |
| JP | 2006-127460 | 5/2006 |
| JP | 2006-164183 | 6/2006 |
| JP | 2008-047031 | 2/2008 |

OTHER PUBLICATIONS

Office Action issued in JP 2008-162037, mailed on Dec. 11, 2012.

* cited by examiner

*Primary Examiner* — Kim Huynh
*Assistant Examiner* — Zahid Choudhury
(74) *Attorney, Agent, or Firm* — McDermott Will & Emery LLP

(57) ABSTRACT

The present invention provides a data processing apparatus realizing reduced load on a host CPU and improved performance. An arithmetic unit includes an SIMD processor for processing a plurality of pieces of data by a single instruction, and a second CPU coupled to the SIMD processor via an arithmetic unit bus and controlling the SIMD processor. A host system includes a host CPU for controlling the entire data processing apparatus, a built-in memory and a peripheral circuit coupled to the host CPU via a first bus, and a peripheral circuit coupled to a second bus. The second CPU accesses an external flash/ROM via the arithmetic unit bus and the first bus, and the SIMD processor accesses an external memory via the second bus. Therefore, the load on the host CPU can be reduced, and the performance of the entire apparatus can be improved.

6 Claims, 10 Drawing Sheets

FIG. 5

| REGISTER NAME | CONTENT | SETTING SIDE |
|---|---|---|
| BOOT BRANCH ADDRESS REGISTER (MX1BADR) | AT STARTUP OF ARITHMETIC UNIT (MX-1), HEAD ADDRESS IN WHICH INITIALIZATION PROGRAM OF ARITHMETIC UNIT (MX-1) OR THE LIKE IS STORED IS DESIGNATED. | HOST SYSTEM |
| BOOT START REGISTER (MX1BOOT) | BY WRITING "1" FROM HOST SYSTEM SIDE TO THIS REGISTER, ARITHMETIC UNIT (MX-1) JUMPS TO ADDRESS DESIGNATED BY "BOOT BRANCH ADDRESS REGISTER" AND EXECUTES INITIALIZATION PROGRAM OR THE LIKE OF ARITHMETIC UNIT (MX-1). | HOST SYSTEM |
| MX-1 COMMAND REGISTER (MX1CMD) | AT THE TIME OF STARTING PROCESS OF ARITHMETIC UNIT (MX-1), INFORMATION NECESSARY TO PERFORM PROCESS FROM HOST SYSTEM IS SET. ARITHMETIC UNIT (MX-1) ANALYZES INFORMATION OF THIS REGISTER AND EXECUTES NECESSARY PROCESS. | HOST SYSTEM |
| MX-1 TASK EXECUTION TRIGGER REGISTER (MX1TRG) | BY WRITING "1" FROM HOST SYSTEM SIDE TO THIS REGISTER, ARITHMETIC UNIT (MX-1) STARTS PROCESS. | HOST SYSTEM |
| MX-1 COMPLETION STATUS REGISTER (MX1CPL) | WHEN PROCESS OF ARITHMETIC UNIT (MX-1) COMPLETES, ARITHMETIC UNIT (MX-1) SETS INFORMATION DESIRED TO BE TRANSMITTED TO HOST SYSTEM SUCH AS PROCESS RESULT. | ARITHMETIC UNIT (MX-1) |
| MX-1 INTERRUPT OUTPUT REGISTER (MX1INT) | WHEN ARITHMETIC UNIT (MX-1) WRITES "1" TO THIS REGISTER ON COMPLETION OF PROCESS OF ARITHMETIC UNIT (MX-1), INTERRUPT SIGNAL INDICATIVE OF COMPLETION OF PROCESS OF ARITHMETIC UNIT (MX-1) IS GENERATED TO HOST SYSTEM TO NOTIFY HOST SYSTEM OF COMPLETION OF PROCESS OF ARITHMETIC UNIT (MX-1). | ARITHMETIC UNIT (MX-1) |

FIG. 6

| REGISTER NAME | CONTENT | SETTING SIDE |
|---|---|---|
| ADDRESS MAP 0 REGISTER (MXMAPADR0) | HEAD ADDRESS OF ADDRESS SPACE OF HOST SYSTEM CORRESPONDING TO ADDRESS SPACE "H'2000_0000 TO H'3FFF_FFFF" OF ARITHMETIC UNIT (MX-1) IS DESIGNATED. IN THE CASE OF FIG. 3, SET VALUE OF THE REGISTER IS "H'0000_0000". | HOST SYSTEM |
| ADDRESS MAP 1 REGISTER (MXMAPADR0) | HEAD ADDRESS OF ADDRESS SPACE OF HOST SYSTEM CORRESPONDING TO ADDRESS SPACE "H'4000_0000 TO H'5FFF_FFFF" OF ARITHMETIC UNIT (MX-1) IS DESIGNATED. IN THE CASE OF FIG. 3, SET VALUE OF THE REGISTER IS "H'2000_0000". | HOST SYSTEM |
| ADDRESS MAP 2 REGISTER (MXMAPADR0) | HEAD ADDRESS OF ADDRESS SPACE OF HOST SYSTEM CORRESPONDING TO ADDRESS SPACE "H'A000_0000 TO H'BFFF_FFFF" OF ARITHMETIC UNIT (MX-1) IS DESIGNATED. IN THE CASE OF FIG. 3, SET VALUE OF THE REGISTER IS "H'C000_0000". | HOST SYSTEM |
| ADDRESS MAP 3 REGISTER (MXMAPADR0) | HEAD ADDRESS OF ADDRESS SPACE OF HOST SYSTEM CORRESPONDING TO ADDRESS SPACE "H'C000_0000 TO H'DFFF_FFFF" OF ARITHMETIC UNIT (MX-1) IS DESIGNATED. IN THE CASE OF FIG. 3, SET VALUE OF THE REGISTER IS "H'E000_0000". | HOST SYSTEM |

FIG. 8

| ADDRESS | +0 | | +1 | | +2 | | +3 | |
|---|---|---|---|---|---|---|---|---|
| | b31 | b24 | b31 | b16 | b15 | b8 | b7 | b0 |
| H'00 | bra 00 \|\| nop (7F 00 F0 00) ||||||||
| H'04 | sub r0, sub r0 (00 00 00 00) ||||||||
| H'08 | sub r0, sub r0 (00 00 00 00) ||||||||
| H'0C | sub r0, sub r0 (00 00 00 00) ||||||||
| H'10 | seth r0, #CMBTADR [31:16] (D0 C0 "CMBTADR [31:16] VALUE") ||||||||
| H'14 | or3 r0, r0, #CMBTADR [15:0] (80 E0 "CMBTADR [15:0] VALUE") ||||||||
| H'18 | jmp r0 → jmp lr (1f C0 1F CE) ||||||||
| H'1C | sub r0, sub r0 (00 00 00 00) ||||||||
| | | | | | | | | |

DATA PROCESSING APPARATUS HAVING ADDRESS CONVERSION CIRCUIT

CROSS-REFERENCE TO RELATED APPLICATIONS

The disclosure of Japanese Patent Application No. 2008-162037 filed on Jun. 20, 2008 including the specification, drawings and abstract is incorporated herein by reference in its entirety.

BACKGROUND OF THE INVENTION

The present invention relates to a data processing apparatus including an SIMD (Single Instruction Multiple Data) processor and a host CPU (Central Processing Unit) for controlling the SIMD processor and, more particularly, to a data processing apparatus capable of efficiently controlling an SIMD processor.

In recent years, with the popularization of a portable terminal device, a digital household electrical appliance, and the like, the importance of a digital signal process for processing a large amount of data such as sound and images at high speed is increasing. One of methods of performing such digital signal process at high speed is a method of making an SIMD processor perform the process. In another method, the digital signal process is performed by using a DSP (Digital Signal Processor).

Generally, as described in Japanese Unexamined Patent Application Publication Nos. 2006-99232, 2006-164183, 2006-127460, and 2008-47031, an SIMD processor is coupled to a bus like a normal peripheral IP (Intellectual Property). In many cases, a host CPU performs another process while controlling the SIMD processor. Japanese Unexamined Patent Application Publication No. H09-22379 discloses a processor having a host CPU that controls a DSP.

SUMMARY OF THE INVENTION

In a system on which an SIMD processor is mounted as described above, the host CPU controls the entire system. The proportion of controls of the SIMD processor in the process amount of the host CPU is large. Depending on applications, there is a case that the CPU can execute a process more efficiently than the SIMD Processor, and there is also a case that the SIMD processor and the CPU have to perform a process in a coordinated manner. In such an application, to make the SIMD processor and the CPU operate in a coordinated manner, a countermeasure such that a CPU having high processing capability is prepared is necessary. Consequently, there are problems such that programming of the application is complicated, power consumption increases, and cost of a package countermeasure or the like increases.

In the case of preparing a CPU dedicated to the SIMD Processor, a memory for starting the CPU for the SIMD processor is necessary in addition to a memory for starting the host CPU, so that the two boot memories have to be held. Accordingly, an I/O terminal for the boot memory for the host system and, in addition, an I/O terminal for the boot memory of the CPU for the SIMD processor are necessary, and the cost increases.

On the other hand, to avoid having double boot memories, a method of sharing a boot memory by the host CPU and the CPU for the SIMD processor may be considered. However, in many CPUs, an address fetched to a memory for the first time after releasing a reset is fixed. In many cases, the address fetched is the same address. Therefore, in the case where the host CPU and the CPU for the SIMD processor execute different start programs, or in the case where the kinds of the CPUs are different from each other, the boot memory cannot be shared.

Like the boot memory, an interface of the external memory has to be prepared for each on the host system side and the SIMD processor side. Double external memories are necessary and the number of interface terminals increases, so that the cost increases.

It can be easily considered that, by converting the address of the SIMD processor for the host CPU by a simple arithmetic operation or the like to make the address issued by the SIMD processor and the address issued by the host CPU, which are received by the boot memory different from each other, a memory is shared by the host CPU and the SIMD processor. However, in cooperation in data process between the host CPU and the SIMD processor, even in an access to the same data having the same address in a data storage memory, it is necessary to manage the address as different addresses in programs of the host CPU and the SIMD Processor. It causes a defect in development of a program and difficulty in management.

In many cases, a development environment of the SIMD processor is of an add-on system of adding a debugging function for the SIMD processor to the environment of the CPU for controlling the SIMD processor. Consequently, as the development environment of the SIMD processor, a development environment of the SIMD processor has to be prepared for each of host CPUs.

The present invention is achieved to solve the problems and an object of the invention is to provide a data processing apparatus realizing reduced load on a host CPU and improved performance.

As an embodiment of the present invention, a data processing apparatus in which an arithmetic unit and a host system are coupled to each other is provided. The arithmetic unit includes an SIMD processor for processing a plurality of pieces of data by a single instruction, and a second CPU coupled to the SIMD processor via an arithmetic unit bus and controlling the SIMD processor. A host system includes a host CPU for controlling the entire data processing apparatus, an external flash/ROM and a peripheral circuit coupled to the host CPU via a first bus, and an external memory coupled to a second bus. The second CPU accesses the external flash/ROM and the peripheral circuit via the arithmetic unit bus and the first bus, and the SIMD processor accesses the external memory via the second bus.

In the embodiment, since the second CPU for controlling the SIMD processor is provided for the arithmetic unit, the load on the host CPU can be reduced, and the performance of the entire apparatus can be improved.

One of the concepts of the embodiment is that there are plural processors, a boot memory storing the boot programs for each processors respectively, and the address conversion unit; the first processor (one of the processors) fetches the first boot program stored in the first area of the boot memory under the waiting period of the other processors; and after completion of boot of the first processor, the second processor (another of the processors) fetches the second boot program stored in the second area of the boot memory by address conversion of the address conversion unit, which become enable in response to completion of the boot of the first processor, from the original address issued by the second processor to the address in the second area.

BRIEF DESCRIPTION OF THE DRAWINGS

FIG. 5 is a diagram (No. 1) for explaining a register group provided for a communication register 17.

FIG. 6 is a diagram (No. 2) for explaining the register group provided for a communication register 17.

FIG. 8 is a diagram showing an instruction output from a boot circuit 16 of the data processing apparatus 1 as a second embodiment of the invention.

DETAILED DESCRIPTION OF THE PREFERRED EMBODIMENTS

First Embodiment

Figure 1:
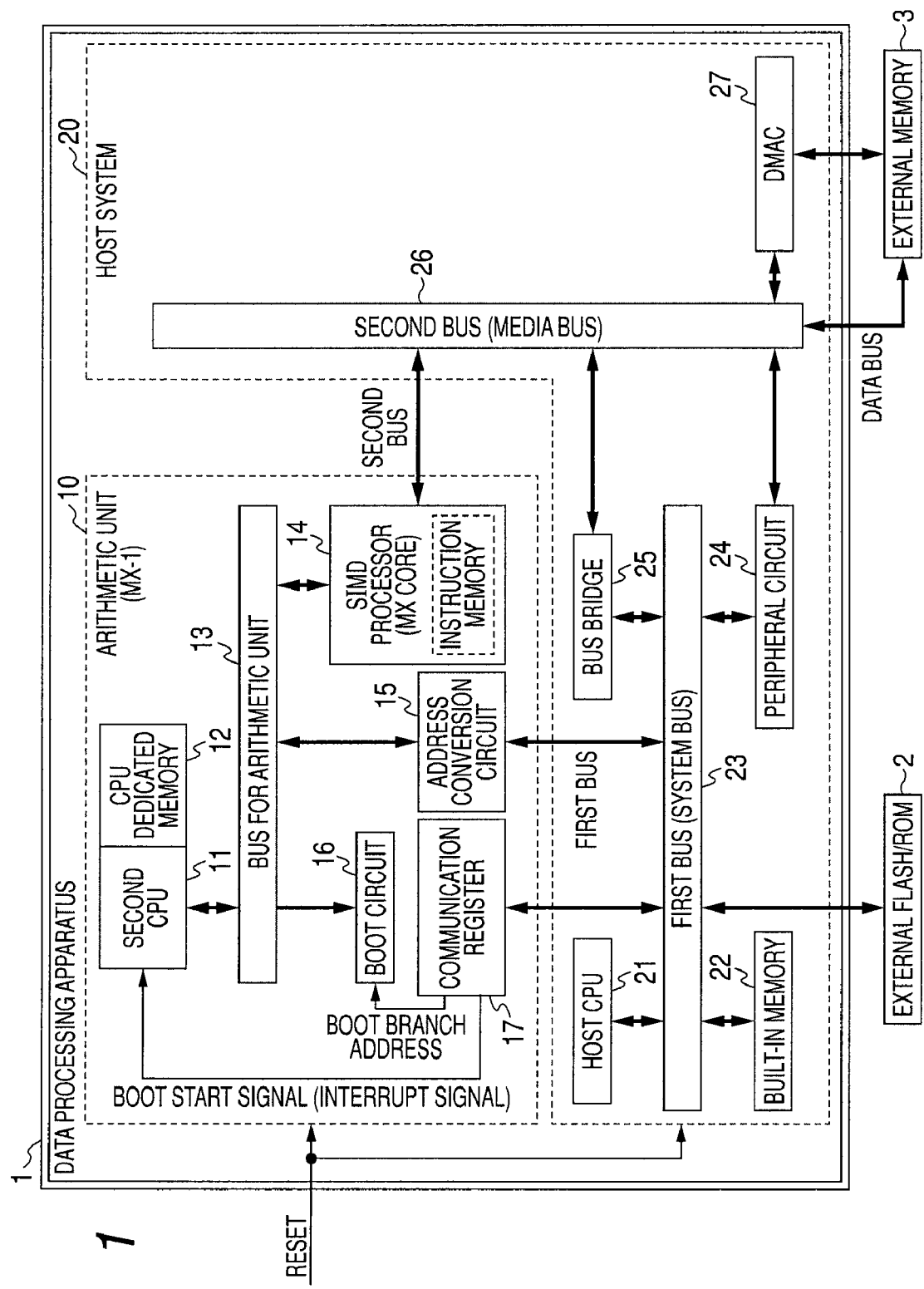
FIG. 1 is a block diagram showing the configuration of a data processing apparatus as a first embodiment of the present invention.

FIG. 1 is a block diagram showing the configuration of a data processing apparatus in a first embodiment of the invention. To a data processing apparatus 1, an external flash/ROM 2 and an external memory 3 are coupled. The data processing apparatus 1 includes an arithmetic unit (hereinbelow, also called MX-1) 10 and a host system 20.

The arithmetic unit 10 includes a second CPU 11, a CPU-dedicated memory 12, an SIMD processor (MX core) 14, an address conversion circuit 15, a boot circuit 16, and a communication register 17. The second CPU 11, the SIMD processor 14, the address conversion circuit 15, and the boot circuit 16 are coupled to a bus 13 for arithmetic unit.

The host system 20 includes a host CPU 21, a built-in memory 22, a peripheral circuit 24, a bus bridge 25, and a DMAC (Direct Memory Access Controller) 27. The host CPU 21, the built-in memory 22, the peripheral circuit 24, and the bus bridge 25 are coupled to a first bus (system bus) 23. To the first bus 23, the address conversion circuit 15 and the communication register 17 in the arithmetic unit 10 and the external flash/ROM 2 are also coupled.

The peripheral circuit 24, the bus bridge 25, and the DMAC 27 are coupled to a second bus (media bus) 26. To the second bus 26, the SIMD processor 14 in the arithmetic unit 10 and the external memory 3 are also coupled.

The second CPU 11 is provided to control the entire arithmetic unit 10, and is coupled to the SIMD processor 14, the address conversion circuit 15, and the boot circuit 16 via the arithmetic unit bus 13. The second CPU 11 executes a program stored in the CPU-dedicated memory 12, thereby controlling the SIMD processor 14 and loading an instruction for the SIMD processor 14, and executes an application in cooperation with the SIMD processor 14. It is assumed that an instruction cache and a data cache which are not shown are mounted on the second CPU 11.

In the CPU-dedicated memory 12, a program to be executed by the second CPU 11, an interrupt vector, and the like are stored.

The SIMD processor 14 is a fine-graded SIMD-type processor. The SIMD processor 14 accesses data to be processed in the external memory 3 or the like via the second bus 26. To the second bus 26, no address conversion circuit is coupled. Since the second bus 26 is a bus used for transferring data to be used for arithmetic operation in the SIMD processor, an address bus is unnecessary. Consequently, at the time of an access via the second bus 26, address conversion which will be described later is not performed. The details of the SIMD processor 14 will be described later. Although only one SIMD processor 1 is mounted in FIG. 1, a plurality of SIMD processors may be mounted.

The address conversion circuit 15 converts an address on an address bus included in the first bus 23 (corresponding also to an access address transfer period in a split transaction bus) in accordance with a preset address conversion map in order to avoid competition of the address space on the arithmetic unit 10 side and the host system 20 side in the first bus 23. For example, in the case where the second CPU 11 accesses the external flash/ROM 2 in order to fetch an instruction, the address conversion circuit 15 receives an address from the second CPU 11 via the arithmetic unit bus 13 and outputs the address subjected to the address conversion to the first bus 23. The address conversion circuit 15 is also connected to the data bus of the arithmetic unit bus 13 and the data bus of the first bus 23 (corresponding to the data transfer period in the split transaction bus), and transfers data between the arithmetic unit bus 13 and the first bus 23. However, the address conversion circuit 15 does not perform address conversion on address information transferred as data on the data buses.

As described above, the address conversion is performed on the address bus of the first bus used mainly by the second CPU to fetch an instruction, and is not performed on the data bus of the first bus and the second bus used for transferring arithmetic data in the SIMD processor. With the configuration, even if an instruction fetch address issued by the second CPU is the same as an instruction fetch address of the host CPU, addresses received by the external flash/ROM 2 are different from each other. On the other hand, the address of storing arithmetic data in the SIMD processor in which data transfer is performed by a DMC or the like is not subjected to the address conversion. Consequently, the arithmetic unit and the host system can access the same data with the same address.

The boot circuit 16 is a circuit for making the second CPU 11 perform process at the time of resetting and startup of the arithmetic unit 10. As will be described later, in response to an access from the second CPU 11, the boot circuit 16 returns a self loop instruction (or wait instruction) at the time of resetting or an instruction of jumping to a boot branch address set in the communication register 17 at the time of startup of the arithmetic unit 10.

The communication register 17 is an access path from the host system 20 to the arithmetic unit 10. From the host system 20 side, the communication register 17 can be seen as one of peripheral circuits of the host system 20. The host system 20 controls the arithmetic unit 10 by accessing various registers mounted in the communication register 17. The details of the various registers will be described later.

The host CPU 21 executes a program stored in the built-in memory 22, thereby controlling the entire data processing apparatus 1. It is assumed that an instruction cache and a data cache which are not shown are mounted on the host CPU 21.

The peripheral circuit 24 is coupled to the first bus 23 and the second bus 26 and mainly performs imaging process or the like under control of the host CPU 21.

The bus bridge 25 mainly bridges the first bus 23 and the second bus 26 and performs bus clock frequency conversion and the like.

The DMAC 27 performs DMAC transfer between the external memory 3 and the SIMD processor 14 in the arithmetic unit 10, the peripheral circuit 24 in the host system 20, and the like. For example, according to a request from the second CPU 11, the DMAC 27 transfers data stored in the external memory 3 to the SIMD processor 14 via the second bus 26. The data bus of the external memory 3 is coupled to the second bus 26. By inputting/output data directly via the second bus 26 not via the DMAC 27, DMA transfer can be performed at higher speed.

Figure 2:
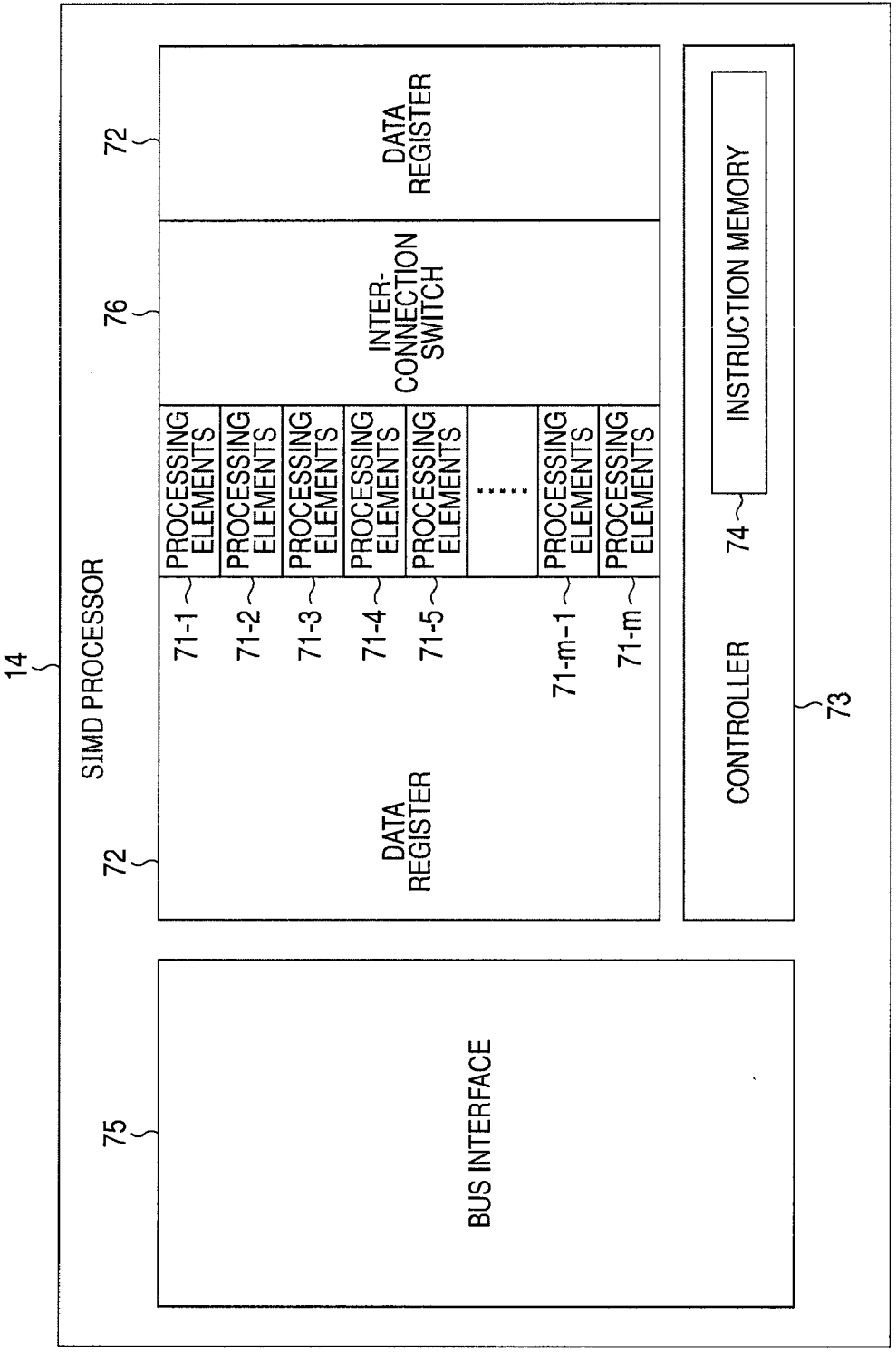
FIG. 2 is a diagram showing an example of the configuration of an SIMD processor 14.

FIG. 2 is a diagram showing an example of the configuration of the SIMD processor 14. The SIMD processor (MX core) 14 includes m pieces of processing elements 71-1 to 71-m, a data register 72, a controller 73, a bus interface 75, and an interconnection switch 76. The controller 73 includes an instruction memory 74.

The data register 72 stores, for example, media data as a sequence of sampled data. For example, data stored in the external memory 3 under control of the DMAC 27 is transferred to the data register 72 via the second bus 26.

The processing elements 71-1 to 71-m perform parallel process by computing elements of the sequence data stored in the data register 72.

The bus interface 75 inputs/outputs data via the arithmetic unit bus 13 or the second bus 26. When a signal process request is received from the second CPU 11, the bus interface 75 outputs the signal process request to the controller 73. When a signal process result is received from the controller 73, the bus interface 75 outputs the signal process result via the arithmetic unit bus 13 or the second bus 26.

When the signal process request is received from the bus interface 75, the controller 73 sequentially makes the processing elements 71-1 to 71-m perform computation corresponding to a microcode stored in the instruction memory 74 and perform a signal process corresponding to the signal process request. The controller 73 outputs the signal process result to the bus interface 75.

The interconnection switch 76 can switch coupling paths of the processing elements 71-1 to 71-m and can make the processing elements 71-1 to 71-m compute data of different entries. Therefore, by storing different data in the entries and making the processing elements 71-1 to 71-m perform parallel computation, data computation can be performed at high speed.

Figure 3:
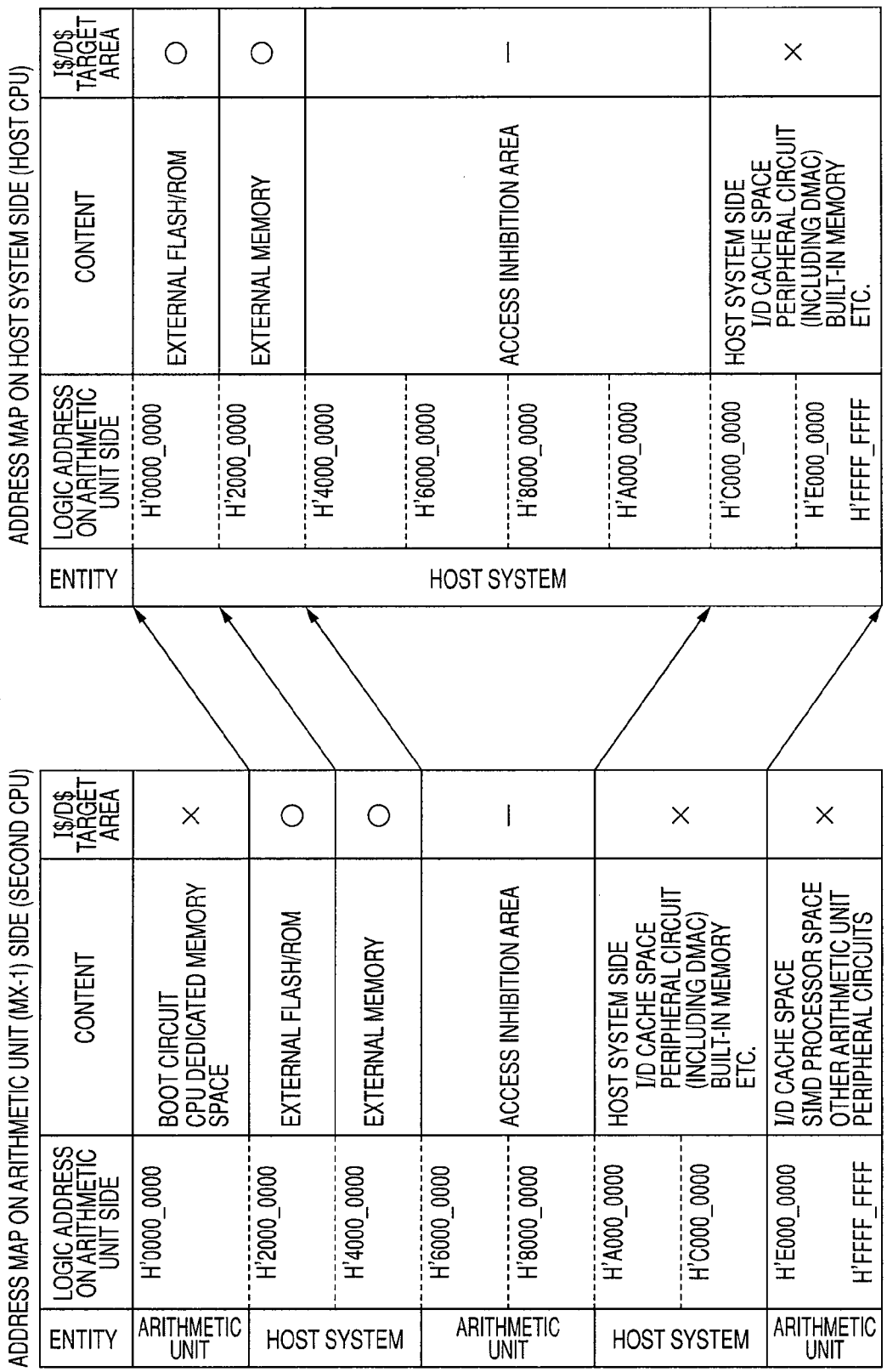
FIG. 3 is a diagram showing an example of an address map in a data processing apparatus 1.

FIG. 3 is a diagram showing an example of an address map in the data processing apparatus 1. In FIG. 3, the left half shows an address map in the arithmetic unit 10 (hereinbelow, called an address map on the arithmetic unit side), and the right half shows an address map in the host system 20 (hereinbelow, called an address map on the host system side).

In the address map on the arithmetic unit side, address spaces H'0000_0000 to H'1FFF_FFFF are assigned to the boot circuit 16 and the CPU-dedicated memory 12 in the arithmetic unit 10 and are not objects of the instruction cache and the data cache.

In the address map on the arithmetic unit side, address spaces H'2000_0000 to H'3FFF_FFFF are assigned to the external flash/ROM 2 on the host system 20 side and are objects of the instruction cache and the data cache.

In the address map on the arithmetic unit side, address spaces H'4000_0000 to H'5FFF_FFFF are assigned to the external memory 3 on the host system 20 side and are objects of the instruction cache and the data cache.

In the address map on the arithmetic unit side, address spaces H'A000_0000 to H'DFFF_FFFF are assigned to instruction/data caches on the host system 20 side, the peripheral circuit 24, the built-in memory 22, and the like and are not objects of the instruction cache and the data cache.

In the address map on the arithmetic unit side, address spaces H'E000_0000 to H'FFFF_FFFF are assigned to instruction/data caches in the arithmetic unit 10, the SIMD processor 14, and the other arithmetic unit peripheral circuit and are not objects of the instruction cache and the data cache.

In the address map on the host system side, address spaces H'0000_0000 to H'1FFF_FFFF are assigned to the external flash/ROM 2 and are objects of the instruction cache and the data cache.

In the address map on the host system side, address spaces H'2000_0000 to H'3FFF_FFFF are assigned to the external memory 3 on the host system 20 side and are objects of the instruction cache and the data cache.

In the address map on the host system side, address spaces H'C000_0000 to H'FFFF_FFFF are assigned to the instruction/data caches on the host system 20 side, the peripheral circuit 24, the built-in memory 22, and the like and are not objects of the instruction cache and the data cache.

For example, in the case where the second CPU 11 in the arithmetic unit 10 accesses the external flash/ROM 2, the address conversion circuit 15 converts the address (H'2000_0000 to H'3FFF_FFFF) output from the second CPU 11 to address (H'0000_0000 to H'1FFF_FFFF) corresponding to the address map on the host system side and outputs the converted address to the first bus 23. Also in the case where the second CPU 11 accesses another resource on the host system 20 side, the address conversion is performed similarly.

The address conversion is performed only in the case where the arithmetic unit 10 accesses the resource on the host system 20 side via the first bus 23, and is not performed in the case where the arithmetic unit 10 accesses the resource on the host system 20 side via the second bus 26. Therefore, for example, in the case where data is transferred from the external memory 3 to the SIMD processor 14 by the DMAC 27, the address on the host system 20 side has to be designated.

Figure 4:
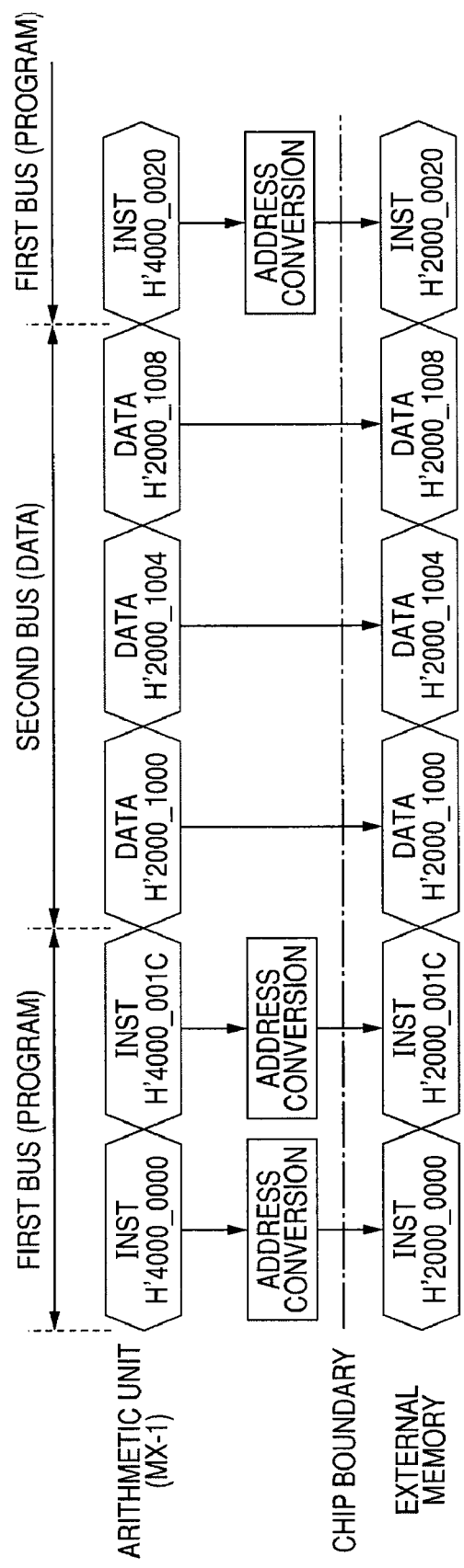
FIG. 4 is a diagram showing an example of a bus access from an arithmetic unit 10 to an external memory 3.

FIG. 4 is a diagram showing an example of a bus access from the arithmetic unit 10 to the external memory 3. In the case where the arithmetic unit 10 fetches an instruction from the external memory 3 via the first bus 23, the address conversion circuit 15 converts the address (H'4000_0000, H'4000_001C, and H'4000_0020) on the arithmetic unit 10 side to the address (H'2000_0000, H'2000_001C, and H'2000_0020) on the host system 20 side.

In the case where the arithmetic unit 10 reads data from the external memory 3 via the second bus 26, the address conversion is not performed. Therefore, an address on the host system 20 side is designated and an access is made.

FIGS. 5 and 6 are diagrams for explaining a register group provided for the communication register 17. A boot branch address register is a register which is set from the host system 20 side and is used for designating the head address in which an initialization program or the like of the arithmetic unit 10 is disposed on start of the arithmetic unit 10.

A boot start register is a register which is set from the host system 20 side. When "1" is written, the arithmetic unit 10 (second CPU 11) jumps to an address designated by the boot branch address register to execute the initialization program or the like of the arithmetic unit 10.

An MX-1 command register is a register which is set from the host system 20 side. In the MX command register, at the time of starting the process of the arithmetic unit 10, information necessary to perform the process is set from the host system 20.

An MX-1 task execution trigger register is a register which is set from the host system 20 side. When "1" is written, the process performed by the arithmetic unit 10 starts.

An MX-1 completion status register is a register which is set from the arithmetic unit 10 side and is used to set information to be transmitted to the host system 20 such as a process result when the arithmetic unit 10 completes the process.

An MX-1 interrupt output register is a register which is set from the arithmetic unit 10 side. By writing "1" when the arithmetic unit 10 completes the process, an interrupt signal indicative of completion of the process of the arithmetic unit 10 is output to the host system 20.

An address map 0 register is a register which is set from the host system 20 side and is used to designate the head address of an address space on the host system 20 side corresponding to the address space "H'2000_0000 to H'3FFF_FFFF" in the arithmetic unit 10. In the case of the address map shown in FIG. 3, "H'0000_0000" is set.

An address map 1 register is a register which is set from the host system 20 side and is used to designate the head address of an address space on the host system 20 side corresponding to the address space "H'4000_0000 to H'5FFF_FFFF" in the arithmetic unit 10. In the case of the address map shown in FIG. 3, "H'2000_0000" is set.

An address map 2 register is a register which is set from the host system 20 side and is used to designate the head address of an address space on the host system 20 side corresponding to the address space "H'A000_0000 to H'BFFF_FFFF" in the arithmetic unit 10. In the case of the address map shown in FIG. 3, "H'C000_0000" is set.

An address map 3 register is a register which is set from the host system 20 side and is used to designate the head address of an address space on the host system 20 side corresponding to the address space "H'C000_0000 to H'DFFF_FFFF" in the arithmetic unit 10. In the case of the address map shown in FIG. 3, "H'E000_0000" is set.

Figure 7:
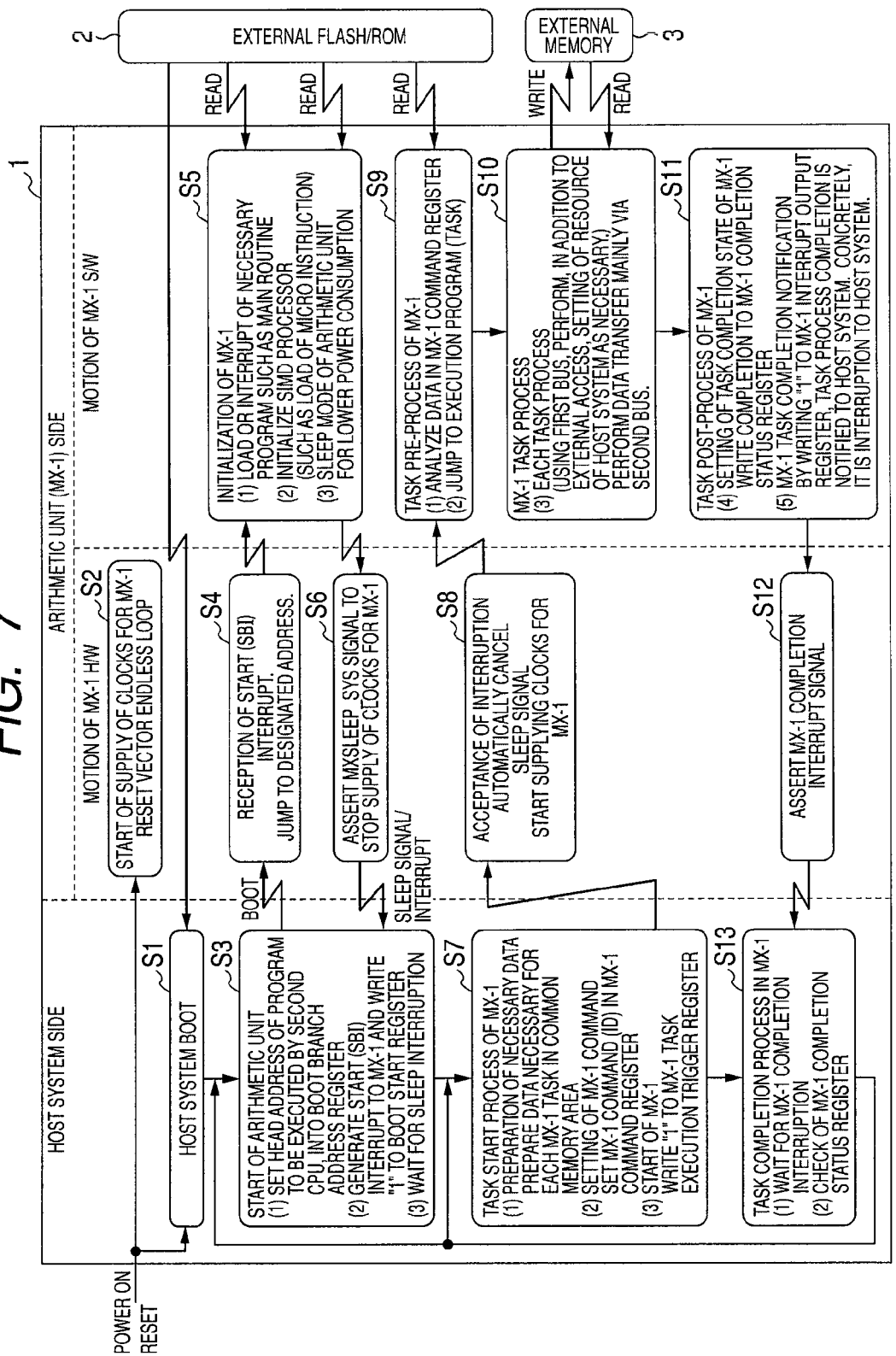
FIG. 7 is a flowchart for explaining the procedure of the arithmetic unit 10 in the data processing apparatus 1.

FIG. 7 is a flowchart for explaining the procedure of the arithmetic unit 10 in the data processing apparatus 1. First, when a reset signal is input to the arithmetic unit 10 and the host system 20, the host CPU 21 in the host system 20 starts booting (S1). At this time, supply of clocks to the arithmetic unit 10 starts, and the second CPU 11 receives a self loop instruction from the boot circuit 16 and enters an infinite loop (S2).

The host CPU 21 in the host system 20 starts the arithmetic unit 10 (S3). The host CPU 21 sets the head address of a program to be executed by the second CPU 11, in the boot branch address register in the communication register 17, and writes "1" in the boot start register, thereby outputting a boot start signal (interrupt signal) to the second CPU 11. After that, the host CPU 21 waits for a sleep interrupt from the arithmetic unit 10. The host CPU 21 performs another process until the sleep interrupt from the arithmetic unit 10 is received.

When the boot start signal (interrupt signal) is received, the second CPU 11 in the arithmetic unit 10 jumps to the boot branch address (S4). The second CPU 11 reads data from the external flash/ROM 2 and initializes the arithmetic unit 10 (S5).

The initialization of the arithmetic unit 10 is interrupt setting, loading of a necessary program such as a main routine, initialization of the SIMD processor 14, and the like. When the initialization of the arithmetic unit 10 ends, a not-shown MXSLEEP_SYS signal is asserted for lower power consumption to make the arithmetic unit 10 enter a sleep state (S6).

When the MXSLEEP_SYS signal (also serving as sleep interrupt) is asserted, the host CPU 20 stops the clock signal supplied to the arithmetic unit 10.

Next, the host CPU 21 in the host system 20 performs a task starting process of the arithmetic unit 10 (S7). The host CPU 21 writes data necessary for each of tasks in a common memory area and sets an MX-1 command in the MX-1 command register in the communication register 17. By writing "1" in an MX-1 task execution trigger register, an interrupt signal is issued to start the arithmetic unit 10.

When the interrupt signal from the host system 20 is received, the second CPU 11 in the arithmetic unit 10 automatically cancels the sleep signal and starts supplying a clock to the arithmetic unit 10 (S8). The second CPU 11 analyzes the MX-1 command which is set in the MX-1 command register in the communication register 17 and, according to an analysis result, jumps an execution program (task) (S9).

Next, the second CPU 11 in the arithmetic unit 10 performs each task process while controlling the SIMD processor 14 (S10). The second CPU 11 accesses the resource on the host system 20 side via the first bus 23. The SIMD processor 14 transfers data to the external memory 3 via the second bus.

When the task process is finished, the second CPU 11 in the arithmetic unit 10 sets a task completion status in the MX-1 completion status register in the communication register 17 and notifies the host system 20 of the task completion process (S11). The notification is sent by asserting a not-shown MX-1 completion interrupt signal (S12).

When the MX-1 completion interrupt signal is received from the arithmetic unit 10, the host CPU 21 in the host system 20 checks the content of the MX-1 completion status register, returns to step S3 or S7, and repeats the subsequent process.

As described above, in the data processing apparatus 1 in the embodiment, the second CPU 11 for controlling the SIMD processor 14 is newly provided in addition to the host CPU 21. Consequently, the host CPU 21 does not have to control the SIMD processor 14. Therefore, the load on the host CPU 21 is reduced, other processes can be performed, and the performance of the entire data processing apparatus 1 can be improved. In addition, specification downgrade such as decrease in the clock frequency of the host CPU 21 can be performed, so that the cost can be reduced.

Since the multi-system configuration of the arithmetic unit 10 and the host system 20 is employed, only by providing the address conversion circuit 15 between the arithmetic unit 10 and the host system 20, the arithmetic unit 10 which does not depend on the platform of the host system 20 can be configured.

Since the arithmetic unit 10 cannot access the resource on the host system 20 side, it becomes unnecessary to add a peripheral device according to the user in the arithmetic unit 10 and to perform customization. Further, data transmission between the host system 20 and the arithmetic unit 10 may be performed via the communication register 17 or via the resource on the host system 20 side. Consequently, only by preparing one IP which is the arithmetic unit 10, various applications can be dealt with.

In a conventional data processing apparatus on which a plurality of different CPUs are mounted, an external memory storing a boot program for each CPU is necessary. In the embodiment, by providing the boot circuit 16 in the arithmetic unit 10 and defining the start sequence, the memory on the host system 20 side can be shared, and the dedicated memory storing the boot program of the arithmetic unit 10 becomes unnecessary. Therefore, cost reduction can be achieved by decrease in the number of external parts, decrease in the number of pins, and the like.

When the arithmetic unit 10 uses the memory on the host system 20 side, application software can be developed without awareness of the memory size on the arithmetic unit 10 side. It becomes therefore unnecessary to customize the memory capacity of the arithmetic unit 10 in accordance with the application. Since the arithmetic unit 10 uses the memory on the host system 20 side, a data access becomes slow. However, by mounting a cache in the second CPU 11 in the arithmetic unit 10, access speed can be improved.

The invention is not limited to the combination of the SIMD processor and the second CPU described in the embodiment. Also by a semiconductor processing apparatus having: an arithmetic unit as a data processing arithmetic unit such as a DSP and capable of fetching a program coupled on the outside; and a host CPU for controlling the entire semiconductor processing apparatus including the arithmetic unit, by converting an address issued by one of them, a program executed by the other can be separated. By separating an access path at the time of accessing data, a data storing area can be shared.

In a conventional data processing apparatus on which an SIMD processor is mounted, a debugger, language environment, development environment such as an ICE (In-Circuit Emulator) and the like have to be prepared in accordance with a host CPU. In the embodiment, by obtaining a multi-system configuration by providing the second CPU 11 for controlling the SIMD processor 14, it is sufficient to develop the development environment of the SIMD processor in accordance with the second CPU 11. Therefore, it becomes unnecessary to depend on the host CPU 21 of the host system 20. Cost reduction by arranging the development environment and improvement in portability of an application program of the arithmetic unit 10 can be realized.

Second Embodiment

The configuration of a data processing apparatus in a second embodiment of the present invention is similar to that of the data processing apparatus in the first embodiment shown in FIG. 1. Therefore, repetitive detailed description of the repetitive configuration and function will not be given.

FIG. 8 is a diagram showing instructions output from the boot circuit 16 of the data processing apparatus 1 in the second embodiment of the present invention. As described in the first embodiment, the boot circuit 16 returns the self loop instruction (or wait instruction) to the second CPU 11 at the time of reset of the arithmetic unit 10, and returns an instruction of jumping to the boot branch address which is set in the boot branch address register in the communication register 17 at the time of start of the arithmetic unit 10. In execution of the self loop instruction, power is consumed when the circuit operation is performed for instruction fetch, decoding, and instruction execution, so that a wait instruction for lower power consumption may be returned.

In FIG. 8, the address H'00 is a start address at the time of reset in the second CPU 11, and the boot circuit 16 returns a self loop instruction "bra 00" to the second CPU 11. The address H'10 is an access address at the time of boot. In the addresses H'10 to H'18, an instruction of jumping to a boot address which is set in the boot branch address register in the communication register 17 is defined.

In the case where a fetch occurs in an address (H'04 to H'0C, H'1C) other than the above addresses, the boot circuit 16 returns "H'0000_0000" to the second CPU 11.

In the embodiment, the self loop instruction and the jump instruction are read only and output from the boot circuit 16. However, if the instructions can be rewritten from the host system 20, there is no dependency on the kind of the second CPU 11, so that portability of the arithmetic unit 10 can be further improved.

As described above, in the data processing apparatus in the second embodiment, the boot circuit 16 returns the self loop instruction and the jump instruction to the second CPU 11, so that an external memory is unnecessary.

Also in a multi system constructed by different CPUs, a single boot memory can be shared. Therefore, cost reduction can be achieved by making an external memory unnecessary and by making a terminal for the external memory unnecessary.

Third Embodiment

Figure 9:
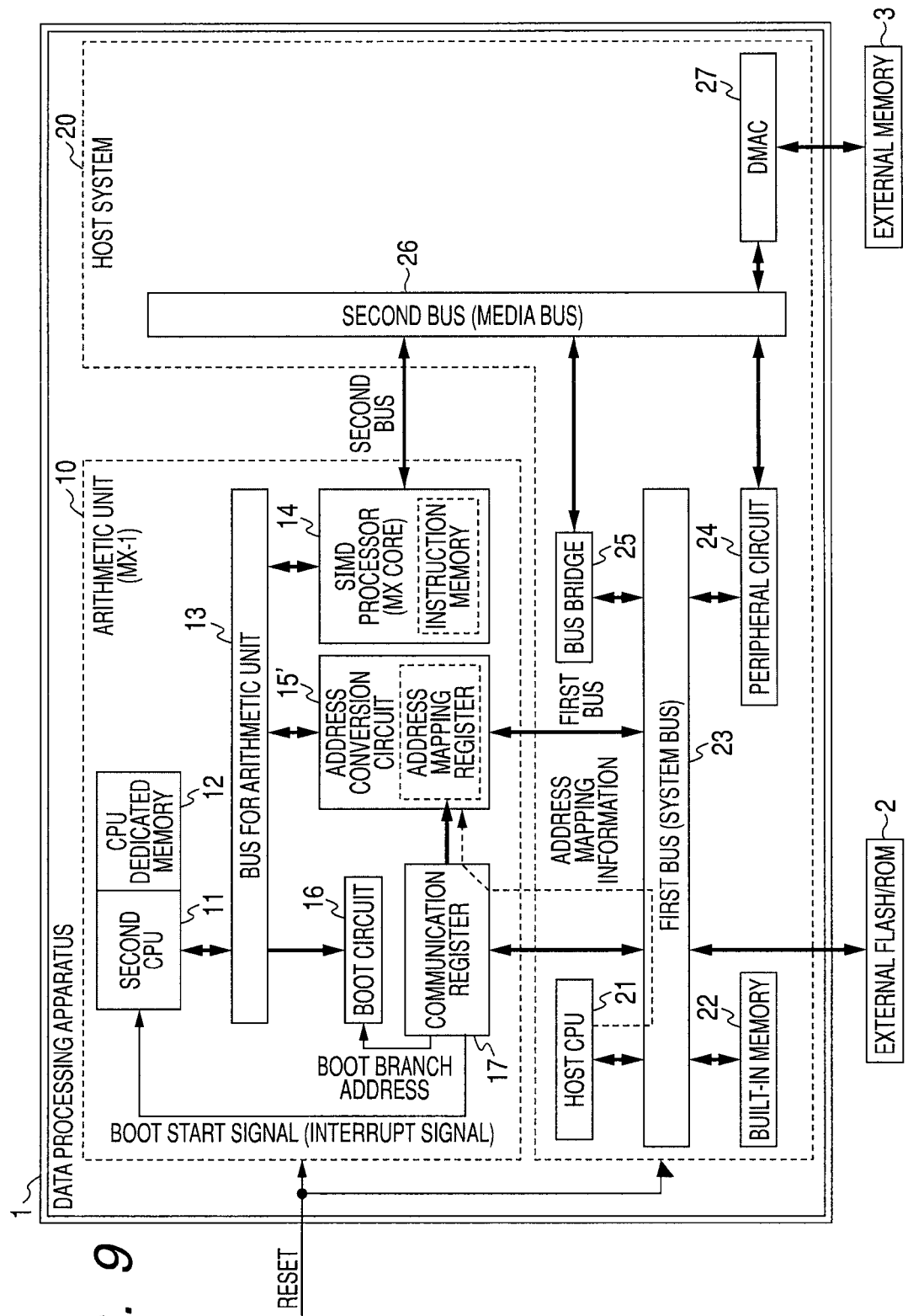
FIG. 9 is a block diagram showing the configuration of a data processing apparatus as a third embodiment of the invention.

FIG. 9 is a block diagram showing the configuration of a data processing apparatus in a third embodiment of the present invention. The configuration of the data processing apparatus is similar to that of the data processing apparatus in the first embodiment shown in FIG. 1 except for the function of the address conversion circuit. Therefore, repetitive detailed description of the configuration and function will not be given.

An address conversion circuit 15' has an address mapping register and values set in the address map 0 register to the address map 3 register in the communication register 17 shown in FIG. 6 are set in the address mapping register in the address conversion circuit 15'. As a result, mapping information for address conversion can be programmably set from the host system 20 side or the second CPU 11 side.

FIG. 9 shows that the mapping information for address conversion is programmably set from the host CPU 21 side to the address mapping register in the address conversion circuit 15' via the communication register 17.

As described above, in the data processing apparatus 1 in the third embodiment, mapping information is set in the address mapping register of the address conversion circuit 15'. Consequently, the memory space on the host system 20 side can be accessed from the arithmetic unit 10, and application software can be developed without awareness of the memory size on the arithmetic unit 10 side.

Since arbitrary mapping information can be set in the address mapping register, a change in the address map on the host system 20 side can be also dealt with.

Fourth Embodiment

Figure 10:
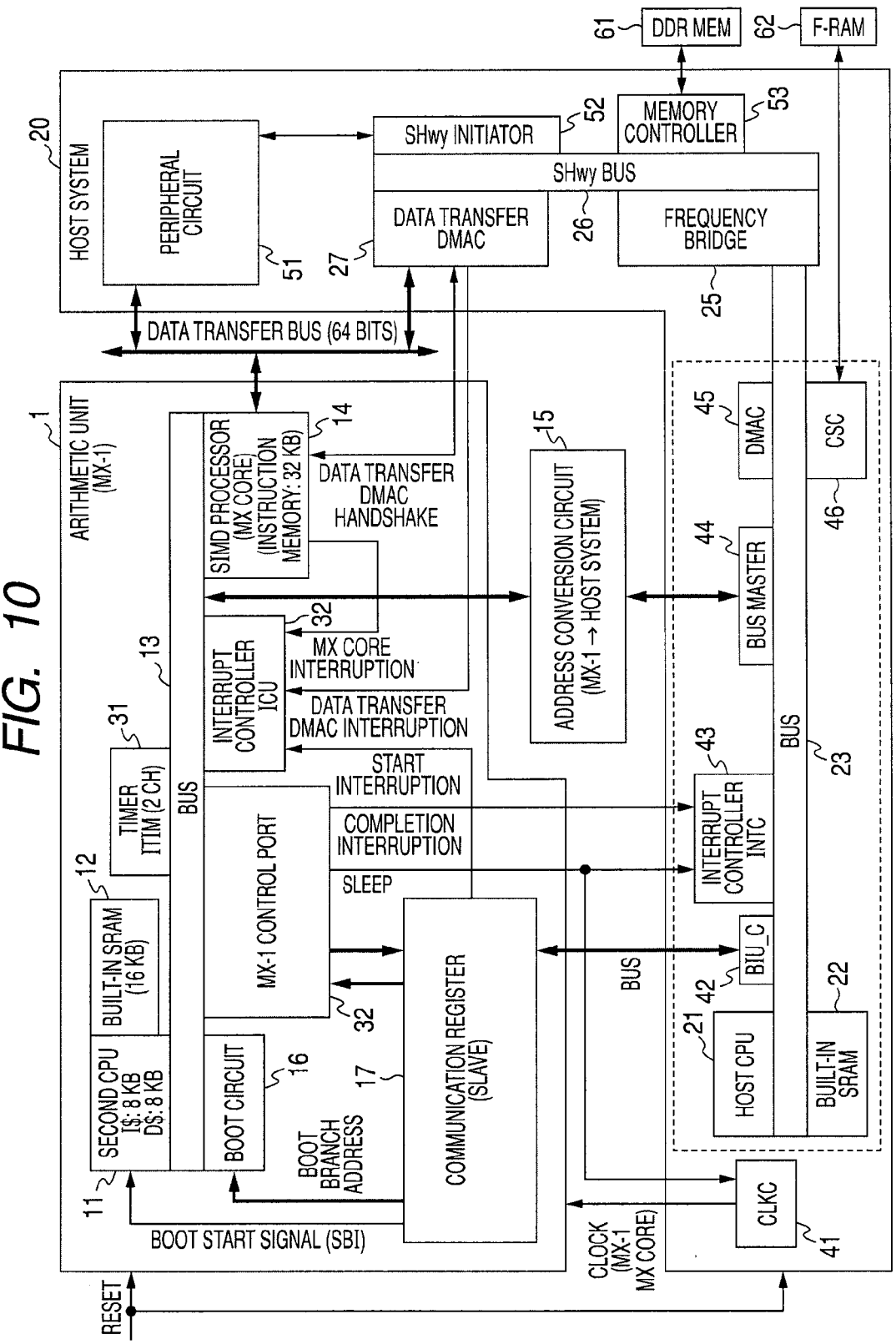
FIG. 10 is a block diagram showing an example of the configuration of a data processing apparatus as a fourth embodiment of the invention.

FIG. 10 is a block diagram showing an example of the configuration of a data processing apparatus in a fourth embodiment of the invention. The same reference numerals are designated to parts having the same configuration and function as those in the data processing apparatus in the first embodiment shown in FIG. 1, and their detailed description will not be repeated.

In the arithmetic unit 10, a timer (ITIM) 31, an MX-1 control port 32, and an interrupt controller (ICU) 33 are added. The timer (ITIM) 31 is an interval timer of two channels. As necessary, other peripheral functions are also added.

The MX-1 control port 32 is coupled to the arithmetic unit bus 13. As described in the first embodiment, the MX-1 control port 32 outputs a signal indicative of a sleep mode to the host system 20. The MX-1 control port 32 transmits data which is set in the MX-1 command register in the communication register 17 to the second CPU 11, and transmits the MX-1 completion status received from the second CPU 11 to the MX-1 completion status register in the communication register 17. The reason why the data in the register is transmitted via the communication register 17 without being connected directly to the host system 20 side is to improve portability as an IP by interfacing with the host system 20 by the communication register 17 even when the host system 20 is changed.

The communication register 17 also has the role of a bus bridge as described in the first embodiment.

The interrupt controller 33 receives a start interruption for a task executed by the arithmetic unit 10, an interruption from the DMAC 27 in the host system 20, interruption from the SIMD processor 14, and other interruptions from the outside of the arithmetic unit 10 and outputs an interrupt request to the second CPU 11.

In the host system 20, a clock controller (CLKC) 41, a bus interface unit (BIU_C) 42, an interrupt controller 43, a bus master 44, a DMAC 45, a chip select controller (CSC) 46, a peripheral circuit 51, a split transaction bus initiator (SHwy initiator) 52, and a memory controller 53 are added. As external memories, a DDR memory 61 and an F-RAM 62 are coupled.

The CLKC 41 controls supply of clocks given to the arithmetic unit 10 in accordance with the sleep status output from the MX-1 control port 32. In the case where the arithmetic unit 10 is in the sleep status, supply of clocks to the arithmetic unit 10 is stopped.

The BIU_C 42 is coupled to the first bus 23. In the case where the host system 20 accesses the arithmetic unit 10 via the communication register 17, the host system 20 makes the access via the BIU_C 42.

The interrupt controller 43 receives a sleep interruption and a completion interruption from the MX-1 control port 32 and outputs an interrupt request to the host CPU 21. The bus master 44 arbitrates an access in the host system 20 and an access sent from the arithmetic unit 10 via the address conversion circuit 15.

The DMAC 45 transfers data among modules in the host system. The CSC 46 generates a chip select signal of the circuits in the host system 20 and the F-RAM 62.

The peripheral circuit 51 includes a camera I/F, an image display I/F, a USB, an Ethernet (registered trademark) controller, and the like. Via the split transaction bus initiator 52 and the split transaction bus (SHwy) 26, an access to the peripheral circuit 51 is performed.

The memory controller 53 controls an access to the DDR memory 61. The SIMD processor 14 is coupled to a data transfer dedicated bus for transferring a single address, and data transfer is performed at high speed between the SIMD processor 1 and the DDR memory 61.

As described above, the data processing apparatus of the fourth embodiment can produce effects similar to those described in the first embodiment.

It should be considered that the embodiments disclosed herein are illustrative and not restrictive in all aspects. The scope of the present invention is defined by the scope of claims rather than by the above description, and all changes that fall within meets and bounds of the claims or equivalent of such meets and bounds are intended to embraced by the claims.

What is claimed is:

1. A data processing apparatus in which an arithmetic unit and a host system are coupled to each other,
   wherein the arithmetic unit includes a first processor for processing a plurality of pieces of data by a single instruction, and a second processor coupled to the first processor via an arithmetic unit bus and controlling the first processor,
   the host system includes a host processor for controlling the entire data processing apparatus, a first memory and a peripheral circuit coupled to the host processor via a first bus, and a second memory coupled to the second bus,
   the second processor accesses the first memory and the peripheral circuit via the arithmetic unit bus and the first bus, and
   the first processor accesses the second memory via the second bus, further comprising
   an address conversion circuit for converting an address output from the second processor to an address corresponding to an address map on the host system side and outputting the resultant address to the first bus.

2. The data processing apparatus according to claim 1, further comprising a communication register in which mapping information of address conversion is set, wherein the address conversion circuit converts an address output from the second processor to an address corresponding to an address map on the host system side on the basis of the mapping information set in the communication register, and outputs the resultant address to the first bus.

3. A data processing apparatus in which an arithmetic unit and a host system are coupled to each other,
   wherein the arithmetic unit includes a first processor for processing a plurality of pieces of data by a single instruction, a second processor coupled to the first processor via an arithmetic unit bus and controlling the first processor, and a boot circuit for performing a boot process for the second processor,
   the host system includes a host processor for controlling the entire data processing apparatus, and a first memory and a peripheral circuit coupled to the host processor via a first bus,
   the second processor executes an instruction output from the boot circuit, thereby performing the boot process, and
   the host processor executed an instruction stored in the first memory, thereby performing the boot process.

4. The data processing apparatus according to claim 3, further comprising a communication register coupled to the first bus and controlling the boot circuit on the basis of a value set by the host processor.

5. The data processing apparatus according to claim 4, wherein the second processor receives a self loop instruction from the boot circuit and executes it at the time of resetting of the arithmetic unit, and receives an instruction to jump to a boot branch address set in the communication register from the boot circuit and executes it at the time of start of the arithmetic unit.

6. The data processing apparatus according to any of claims 3 to 5, further comprising an address conversion circuit for converting an address output from the second processor to an address corresponding to an address map on the host system side, and outputs the resultant address to the first bus.

* * * * *